Patented Jan. 15, 1952

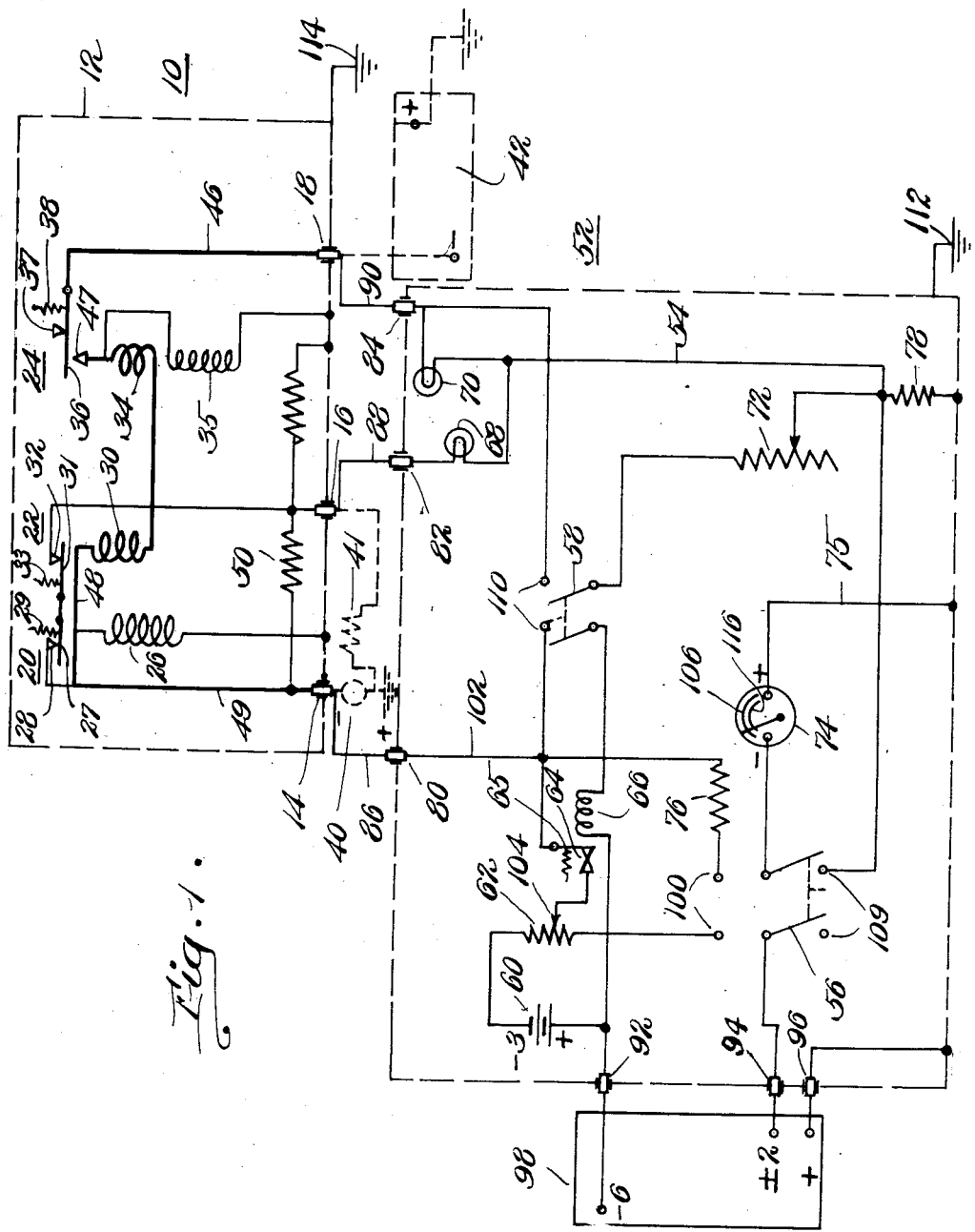

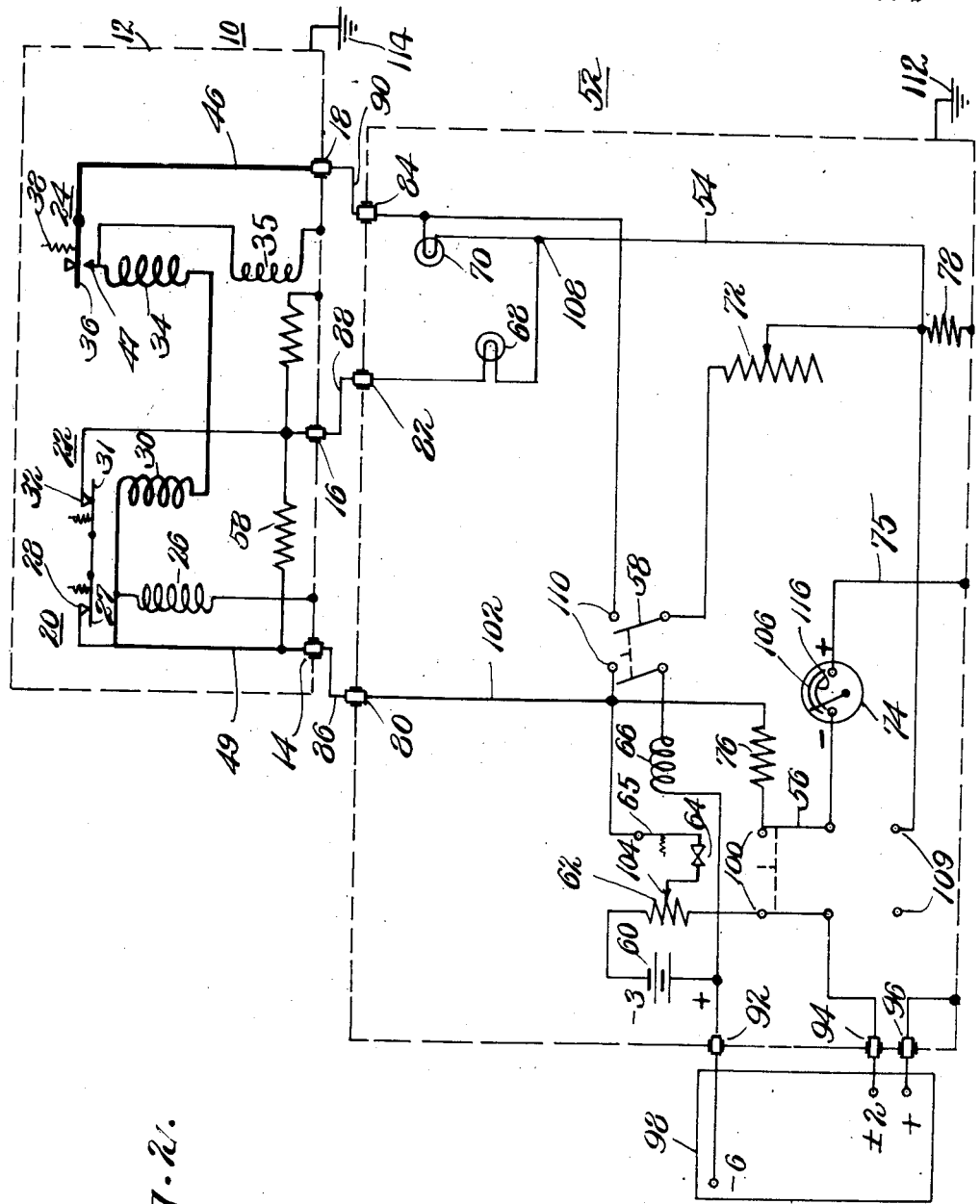

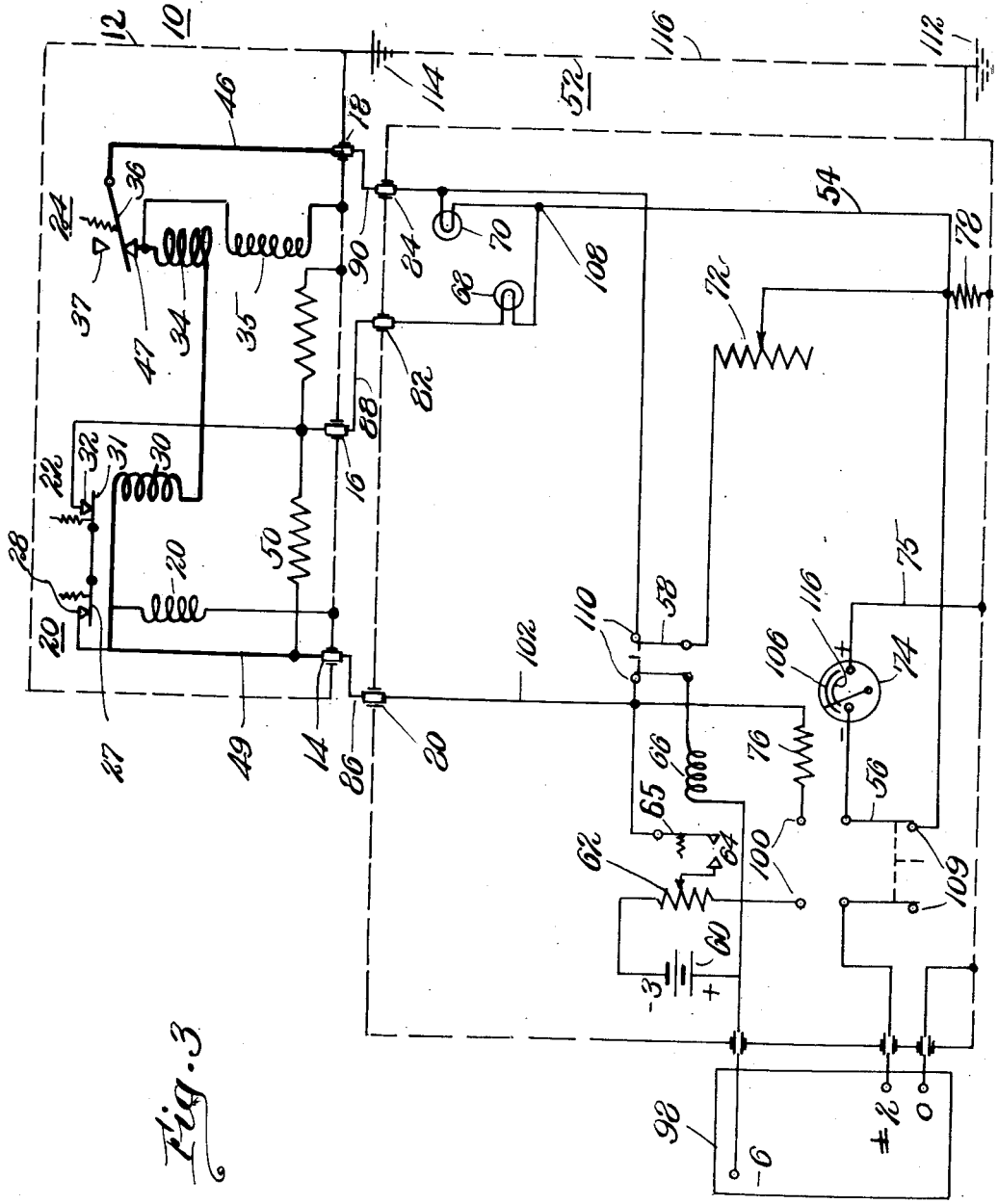

2,582,460

UNITED STATES PATENT OFFICE 2,582,460

APPARATUS FOR TESTING AUTOMATIC
STORAGE BATTERY CHARGERS

Edward Salzberg, Roxbury, Mass.

Application September 14, 1948, Serial No. 49,245

9 Claims. (Cl. 175—183)

1

The present invention relates to testing apparatus and more particularly to such apparatus useful in testing automatic storage battery chargers having automatic electrically actuated control devices such as commonly used in motor vehicles.

The general object of my invention is to provide a tester of this type that will effect the desired result in a more facile, economic and efficient manner than those now in use.

With this and other objects in view, my invention consists in the novel features, parts, and combinations and subcombinations of parts, which are particularly described in connection with the accompanying drawings which illustrate one form of apparatus and circuit arrangements that has been found to give good results in practice.

In the drawings which accompany and form a part of this specification,

Figure 1 is a diagram of apparatus and circuit arrangements embodying my invention, the control switches being show in normal or inoperative relation, together with one type of automatic storage battery charger having a cutout control, a voltage control, and a current control.

Fig. 2 is a similar diagram showing the positions of the hand-operated tester switches when the tester is employed to test the cutout control and the voltage control of the automatic storage battery charger, and Fig. 3 is a diagram showing the positions of said switches when the tester is used to test the current control of said automatic storage battery charger.

In the particular drawings selected to illustrate my invention and the principle underlying the same, said drawings to be considered as illustrative, merely, and not restrictive, 10 shows a well known type of automatic storage battery charger provided with electrically actuated cutout, voltage and current controls interposed between the generator armature terminal, the generator field terminal and the storage battery cutout terminal.

In some motor vehicle storage battery charging systems, the voltage control is omitted. To test such chargers, my tester is just as applicable as if all three controls were present.

The system 10 is generally enclosed within a metallic casing 12 provided with three terminals in the form of binding posts, viz., the generator armature terminal 14, the generator field terminal 16, and the battery terminal 18, each of said binding posts being, of course, insulated from the

2 casing 12, as indicated. Interposed between said terminals is the voltage control 20, the current control 22 and the cutout control 24. The voltage control comprises an electromagnet having a winding 26 of a relatively large number of turns around a core (not shown) and an armature 27 held against the contact point 28 by a suitable adjustable spring 29, herein shown for convenience as a spiral tension spring. The current control consists of an electromagnet having a winding 30 of a relatively few turns of wire of larger diameter than that of the coil 26 on a core (not shown) and an armature 31 held on its contact point 32 by an adjustable spring 33. The battery cutout control comprises an electromagnet having two serially connected windings 34 and 35, each wound on the same core (not shown), the winding 34 comprising a relatively small number of turns of wire having a larger diameter than the wire employed for the winding 35, the latter winding having a relatively large number of turns, and an armature 36 held on its back stop 37 by a suitable adjustable spring 38. The generator 40 disposed for operation by the automobile is shown in the present instance as a shunt wound generator having a field winding 41, one end of which is connected to the grounded positive terminal of the armature and the other terminal of which is connected via the control members 20, 22, to the binding post 14, which in turn is connected to the negative terminal of the armature.

The automobile storage battery 42 to be charged has its positive terminal grounded on a suitable conductive portion of the car and its negative terminal connected to the binding post 18 which constitutes the battery terminal of the charger. The casing 12 of the charging system is shown in the present instance as grounded at 114.

It will be understood, of course, that the generator 40 and storage battery 42 are represented by dotted lines merely for completeness of disclosure because when my tester is attached to the binding posts 14, 16 and 18, said generator and storage battery are disconnected, as indicated in Figs. 2 and 3.

When the voltage of the generator 40 slightly exceeds that of the storage battery 42, the cutout control 24 closes the circuit which includes the generator and battery, via the generator ground to the battery ground, thence, by conductor 46, armature 36, contact point 47, through windings 34, 30, leads 48 and 49, to the generator negative terminal, this circuit being indicated in heavy lines. When the battery voltage exceeds the generator voltage, the circuit aforesaid is broken.

When the voltage of the generator becomes excessive as when the car is speeded up, the armature 27, acted upon by the winding 26, will break the normal circuit of the generator field, viz., field 41, binding post 16, current control armature or switch member 31, voltage control armature or switch member 27, thence, by lead 49 to the armature negative terminal which, of course, is the other terminal of the field coil, thereby cutting into the internal circuit of the generator the resistance 50, and reducing the generator voltage to a safe value.

In like manner, when the current flowing through the circuit which includes the winding 30 of the current control, exceeds a safe value, the armature or switch member 31 is actuated and cuts into the internal generator circuit, the said resistance 50.

Battery chargers of the type above described frequently fail to function properly, or at all, due to a variety of causes, among others, the improper tensioning of the armature springs 29, 33, 38. Each armature 37, 31, 36, is designed to operate at a certain voltage or current and when, by my improved tester, it is ascertained that the operating voltage or current, as the case may be, is too high, the tension of the armature spring is reduced, and if the operating voltage or current is too low, such tension is increased.

It is preferred to measure the precise operating voltage or current by a calibrated meter, but this is not necessary because, as hereinafter more fully explained, the scale of a suitable electric measuring means, such, for example, as a milliammeter, may be calibrated arbitrarily in such manner that if the operating voltage or current of a control is higher or lower than a given value indicated on the scale, the operator will know at once how to adjust the faulty tensioning of the springs.

Another cause of faulty operation or complete inoperativeness, is the fouling of the contact members. By means of current responsive non-metering signal means, such, for example, as pilot lights, buzzers, annunciators or the like which indicate, visually or audibly, changes of current condition in a circuit or changes in the voltage across an element, but do not measure the values of either, such defect can be located and remedied. In all cases, my tester can be connected to the battery charger without removing the latter from the car in which it is installed after disconnecting the generator 40 and storage battery 42 indicated in dotted lines in Figure 1, or, as the customer sometimes prefers, the battery charger and regulator may be removed from the car and brought to a garage for test.

Referring to Fig. 1, the essential elements of my tester 52, which, as shown, may be enclosed within a grounded case, are, a main manually actuated double pole double throw switch 56; a double pole single throw manually actuated heavy duty auxiliary switch 58; a 3-volt heavy duty battery 60 in circuit with a variable resistance 62; a normally closed switch 64 controlled by a low resistance electromagnet 66, which when energized by four amperes will separate its armature 65 from its co-operating contact; two current responsive non-metering signal means, such as the pilot lamps 68, 70; a variable resistance 72 which, in the present instance, may be a .5 ohm heavy duty rheostat; electric meter means 74; a meter series resistance 76, and a meter shunt resistance 78.

Various leads of the tester are connected to the binding posts 80, 82, 84, each insulated, as indicated, from the casing of the tester 52 and having connected thereto external leads 86, 88, 90, respectively, for connection to the binding posts 14, 16, 18, of the charger, such connections preferably being made by the usual spring clips (not shown).

Connected to the binding posts 92, 94, 96, each insulated from the casing of the tester 52, are the indicated terminals of a 3-cell storage battery 98, which is part of the standard equipment of every garage, the arrangement being such that by the switching means shown, the voltage of the battery 60 may be added to that of said storage battery.

*Cutout control test*

To determine whether or not the cutout control operates at the proper voltage, the main switch 56 is thrown over to the contact members 100, thereby closing a circuit through the lamp 68 or other current responsive non-metering signal means, either audible or visual, by way of the positive terminal of the power source 98 grounded on the instrument case, to and through the resistor 78, the lamp 68, the switch members 31, 32, of the current control, the switch members 27, 28, of the voltage control, thence, by the leads 49, 102, to the switch members 64; thence, to the power source 60—98, via the adjustable resistance 62. The circuit of the current responsive signal means 70 will be open at the switch members 36, 47, of the cutout control.

The resistance 62 is then gradually reduced in any suitable manner, as for example, by moving the slider 104 in the proper direction which, in the present instance will be toward the negative pole of battery 60 until the circuit of the lamp 70 is closed by the switch members 36, 47, the circuit of the lamp 68 remaining closed.

When the main switch 56 is closed on its contact members 100, a portion of, or all, the resistance 62 will be in circuit with the power source and the electro-magnet 34, which controls the armature 37 of the cutout control. This circuit is as follows: From the positive pole of the battery 98 to the ground 112 of the tester casing, ground 114 of the charging casing, through coils 35, 34, leads 49, 102, to negative pole of said battery via switch 64 and resistance 62.

It will be observed that the lamp 70 is serially connected between the switch member 36 of the cutout control and the power source and that upon the actuation of said control, the circuit of said lamp will be closed, whereupon the electric meter means will be connected across the circuit including said signal means 70 and said resistance element 78, the circuit of said meter being as follows: From the positive terminal of the meter by lead 75 to the resistor 78, thence, by lead 54 to the juncture of the lamps 68, 70, through lamp 70, lead 46, armature member 36 and contact point 47 through the low resistance windings 34, 30, the leads 49, 102, thence to the other terminal of said meter means via the resistance 76 and switch 56.

The reading of the meter is noted as soon as the lamp 70 is lighted, or other suitable signal means, either audible or visual, actuated.

As above indicated, the meter may be accurately calibrated, for example, it may have one scale 106 calibrated in volts for use when testing the cutout control and the voltage control, and a second scale 116 calibrated in amperes for use in testing the current control.

Every experienced operator, however, knows the approximate operating voltage of the cutout control of every type of charger and regulator, the exact value being immaterial. He knows also that there is no need for adjustment of the tension of the spring 38 holding the armature 36 on its back stop, if the operating voltage of the cutout control he is testing approximates the value set out in the manufacturer's service manual. He may therefore determine empirically the position of the needle on the scale 106 when the lamp 70 is lighted by applying my tester to a standard charger and regulator and making the "cutout control test" above described. This position will then be marked on said scale in some distinctive manner to show that it represents the operating voltage of the usual cutout control.

Thereafter, in making a test of the same type of charger and regulator to determine the proper functioning of the cutout control, he will merely note the position of the needle with respect to such mark when said lamp 70 is cut in. If the needle is beyond said mark (clockwise), he will know that the operating voltage of the subject cutout is too high and will reduce the tension of the spring 38 progressively until the needle coincides with said mark when the lamp 70 is lighted. In like manner, should the needle be below said mark (counterclockwise) when lamp 70 is cut in, he will know that the operating voltage of the cutout control is too low and will progressively increase the tension of the spring 38 until the needle coincides with said mark when lamp 70 is cut in. It is therefore possible for an unskilled operator to make accurate tests of cutout control without a meter precisely calibrated to read electrical quantities.

*Voltage control test*

To determine the operating voltage of the voltage control and limiter 20, the circuit shown in Fig. 2 is used and the resistance 62 is further reduced below the point at which the actuation of the cutout control is effected and until the armature or switch member 27 is drawn from its back stop 28, thereby opening the circuit of the signal means 68, herein shown as a pilot lamp, whereupon the meter will show the operating voltage of the voltage control device.

It will be noted that the meter 74 is connected across the circuit which includes the lamp 68 and the resistor 78, the circuit being as follows: From the positive terminal of the meter by lead 75 to the resistance 78, thence by lead 54 to lamp 68, lead 88, switch member 31, 32, and switch members 27, 28, thence by leads 49, 102, and resistance 76 to the negative terminal of said meter. Here again, a calibrated meter may be used to indicate the voltage at which the signal lamp goes out, or the procedure above set out in connection with the cutout control test may be followed, and a second distinctive mark may be placed on said scale 106.

In this case also, any unduly high resistance between the switch members 27, 28, due to the fouling thereof, can be ascertained and rectified because if the contact between said members is not clean, lamp 68 will flicker as the resistance 62 is varied and the brilliancy thereof will be less than that of lamp 70.

*Current control test*

To determine the operating current of the current control and limiter 22, main switch 56 is brought back to its contact members 109 and the auxiliary switch 58 is closed on its contacts 110, thereby energizing the low resistance switch magnet 66, cutting out the battery 60 from the power source and the resistance 62 from the circuit thereof, and connecting the battery 98 directly to terminal 14 via winding 66, switch 58, and lead 102 (Fig. 3).

In making this test, it is necessary to keep the cutout control 24 activated to such an extent that the switch members 36, 47, will remain closed throughout the test and this is effected by closing switch 58 and sending through the low resistance coil 34 a current of sufficient intensity to maintain said switch members 36, 47, closed.

The circuit is as follows: From the positive terminal of the battery 98, to ground 112, ground 114, cutout control windings 35, 34, current control winding 30, thence, to the negative terminal of battery 98 via armature terminal 14, lead 102, switch 58 and winding 66. (It will be understood, of course, that when the charger is tested without removing it from the car, the ground 112 will consist of an electrically conductive portion of the car that is not insulated from the portion of the car to which the charger is grounded at 114. When the charger is tested after removal from the car, as is frequently the case, then ground terminals 112, 114, may be connected by a lead 116.)

As soon as the armature 36 of the cutout control is brought against its co-operating contact member 47, there will be a circuit through lamp 70, as follows: From positive pole of battery 98 to resistance 78, lead 54, lamp 70, lead 46, switch 36, thence, via coils 34, 30, leads 49, 102, and switch 58 to the negative pole of said battery.

The circuit through the lamp 68 may be traced as follows: From the positive pole of battery 98, through resistance 78, lamp 68, thence back to the negative terminal of said battery via switch members 31, 32, switch members 27, 28, lead 102, switch 58, winding 66. The current through the current control winding 30 is now increased by reducing the resistance of resistor 72 until the circuit of lamp 68 is broken at the switch members 31, 32, whereupon the meter will indicate the operating current of the current control.

It will be observed that the meter is connected across the resistance element 78 and is in series with the signal means 70 and the electromagnet 30 of the current control, and, if desired, the scale 116 may either be calibrated to translate the potential drop thereacross into units of current, or else the operator may mark upon said scale the position of the needle when, during the test of the current control of a standard charger and regulator, the circuit of the lamp 68 is opened and the lamp extinguished.

In making this test, any fouling of the switch members 31, 32, can be ascertained by the flickering of the lamp 68 with the variation of the resistance 72 and by the increased brilliancy of lamp 70 with respect to lamp 68.

Among the numerous advantages of my improved tester over those now in use and proposed, are that it is easier to operate, tests may be made more rapidly, the first cost and the running cost are lower, the usual motor generator as a source of power is eliminated, the pilot lights give definite indications of the exact moment the operating voltage or current of the respective controls is reached, the three external leads 86, 88, 90, are always attached for every test to the charger terminals 14, 16, 18, respectively, and remain so attached until the completion of the tests, it is portable and can be handled by one operator only, and an unskilled operator can make accurate tests without an assistant.

By the phrase "characteristic of the power" at which a control operates, I desire to be understood as meaning either voltage or current, or the position of the needle on the meter scale at the instant of operation of a control, such position being a function of the power expended in the control magnet to move the needle to such position.

Having thus described an illustrative embodiment of my invention without, however, limiting the same thereto, what I claim and desire to secure by Letters Patent is:

1. An apparatus for testing an automatic storage battery charger having an electric generator armature terminal, an electric generator field terminal and a storage battery terminal and provided with a plurality of electromagnetically actuated control devices, including at least a current control and a storage-battery cutout control, each having a switch and a co-operating electromagnet, each said switch being connected to a different one of said terminals, said apparatus comprising in combination, a source of static electric power, means connecting said source of power in circuit with the switch members of said controls, means for varying the current in said circuit, a first current responsive non-metering signal means in circuit with the switch member of said current control and said power source, a second current responsive signal means in circuit with the switch member of said cutout control and said power source, and meter means connected across the circuit of second signal means, whereby a characteristic of the power at which said cutout control operates may be indicated upon the operation of said second signal means.

2. An apparatus for testing an automatic storage battery charger having an electric generator armature terminal, an electric generator field terminal and a storage battery terminal and provided with a plurality of electromagnetically actuated control devices, including at least a voltage control, and a storage battery cutout control, each having a switch and a cooperating electromagnet, each said switch being connected to a different one of said terminals, said apparatus comprising in combination, a source of static electric power, means connecting said source of power in circuit with the switch members of said controls, means for varying the current in the said circuit, a first current responsive non-metering signal means in circuit with the switch member of said voltage control and said power source, a second current responsive non-metering signal means in circuit with the switch member of said cutout control and said power source, and meter means connected across the circuit of said second signal means, whereby a characteristic of the power at which said cutout control operates may be indicated upon the operation of said second signal means.

3. An apparatus for testing an automatic storage battery charger having an electric generator armature terminal, an electric generator field terminal, and a storage battery terminal, and provided with a plurality of electromagnetically actuated control devices, including a voltage control, a current control and a storage battery cutout control, each having a switch and a co-operating electromagnet, each said switch being connected to a different one of said terminals, said apparatus comprising in combination, a portable metallic casing having three terminals, leads for temporarily connecting said terminals to the respective terminals of said battery charger in order to test the latter, a source of static electric power, a first current responsive non-metering signal means in circuit with the switch members of said voltage and current controls and said power source, a variable resistor in the circuit of said switch members and also in the circuit of the electromagnet of said cutout control and said power source, a second current responsive non-metering signal means in circuit with the switch member of said cutout control and said power source, whereby, upon the reduction of the resistance of said variable resistor, the switch member of said cutout control will close the circuit of said second signal means, and meter means connected across the circuit of said second signal means, whereby the operating voltage of said cutout control may be determined upon the operation of said second signal means.

4. An apparatus for testing an automatic storage battery charger having an electric generator armature terminal, an electric generator field terminal, and a storage battery terminal, and provided with a plurality of electromagnetically actuated control devices, including a voltage control, a current control and a storage battery cutout control, each having a switch and a co-operating electromagnet, each said switch being connected to a different one of said terminals, said apparatus comprising in combination, a portable metallic casing having three terminals, leads for temporarily connecting said terminals to the respective terminals of said battery charger in order to test the latter, a source of static electric power, a first current responsive non-metering signal means in circuit with the switch members of said voltage and current controls and said power source, a variable resistor in the circuit of said switch members and also in the circuit of the electromagnet of said cutout control and said power source, a second current responsive non-metering signal means in circuit with the switch member of said cutout control and said power source, whereby, upon the reduction of the resistance of said variable resistor, the switch member of said cutout control will close the circuit of said second signal means, and meter means connected across the circuit of said second signal means, whereby the operating voltage of said cutout control may be determined upon the operation of said second signal means.

5. An apparatus for testing an automatic storage battery charger having an electric generator armature terminal, an electric generator field terminal, and a storage battery terminal, and provided with a plurality of electromagnetically actuated control devices, including at least a voltage control and a storage battery cutout control, each having a switch and a co-operating electromagnet, each said switch being connected to a different one of said terminals, said apparatus comprising in combination, a portable metallic casing having three terminals, leads for temporarily connecting said terminals to the respective terminals of said battery charger, in order to test the latter, a source of static electric power, a current responsive non-metering signal means in circuit with the switch of said voltage control and said power source, a variable resistor in the circuit of the switch of said voltage control, and also in the circuit of the electromagnet of said voltage control and said power source, whereby, upon the reduction of the resistance of said variable resistor, the switch of said voltage control will open the circuit of said signal means, and meter means connected across the circuit of said signal means, whereby the operating voltage of said voltage control may be determined upon the operation of said signal means.

6. An apparatus for testing an automatic storage battery charger having an electric generator armature terminal, an electric generator field terminal, and a storage battery terminal, and provided with a plurality of electromagnetically actuated control devices, including at least a current control and a storage battery cutout control, each having a switch and a co-operating electromagnet, each said switch being connected to a different one of said terminals, said apparatus comprising, in combination, a portable metallic casing having three terminals, leads for temporarily connecting said terminals to the respective terminals of said battery charger, in order to test the latter, a source of static electric power, a current responsive non-metering signal means in circuit with the switch of said current control and said power source, a variable resistor in the circuit of the switch of said current control and also in the circuit of the electromagnet of said current control and said power source, whereby, upon the reduction of the resistance of said variable resistor, the switch of said current control will open the circuit of said signal means, and meter means connected in series with the circuit of said signal means and also with the electromagnet of said current control, whereby the operating current of said current control may be determined upon the operation of said signal means.

7. An apparatus for testing an automatic storage battery charger having an electric generator armature terminal, an electric generator field terminal, and a storage battery terminal, and provided with a plurality of electromagnetically actuated control devices, including a voltage control, a current control and a storage battery cutout control, each having a switch and a co-operating electromagnet, each said switch being connected to a different one of said terminals, said apparatus comprising in combination a portable casing having three terminals, leads for temporarily connecting said terminals to the respective terminals of said battery charger, a source of static electric power, a first current-responsive non-metering signal means in circuit with the switches of said voltage and current controls and said power source, a second current responsive non-metering signal means in circuit with the switch of said cutout control, a first variable resistor in circuit with said switches, a first switch means connecting said first resistor and said source in the circuit of said switches, whereby said apparatus is placed in condition for testing said voltage and cutout controls, a second variable resistor, a second switch means for connecting said second resistor in circuit with the switch of said cutout control and the electromagnet of said current control whereby said apparatus is placed in condition for testing said current control.

8. An apparatus for testing an automatic storage battery charger having an electric generator armature terminal, an electric generator field terminal, and a storage battery terminal, and provided with a plurality of electromagnetically actuated control devices, including a voltage control, a current control and a storage battery cutout control, each having a switch and a cooperating electromagnet, each said switch being connected to a different one of said terminals, said apparatus comprising in combination a portable casing having three terminals, leads for temporarily connecting said terminals to the respective terminals of said battery charger, a source of static electric power, a first current-responsive non-metering signal means, in circuit with the switches of said voltage and current controls and said power source, a second current responsive non-metering signal means in circuit with the switch of said cutout control, a first variable resistor in circuit with said switches, a first switch means connecting said first resistor and said source in the circuit of said switches, whereby said apparatus is placed in condition for testing said voltage and cutout controls, a second variable resistor, a second switch means for connecting said second resistor in circuit with the switch of said cutout control and the electromagnet of said current control, an electromagnetic switch, and a circuit including said electromagnetic switch, leads from said electromagnetic switch, said second switch means, other leads from said electromagnetic switch and a portion of said power source, whereby when said second switch means is closed the voltage of the power source that is impressed on said current control is reduced and said apparatus is placed in condition for testing said current control.

9. In an apparatus for testing an automatic storage battery charger having an electric generator armature terminal, an electric generator field terminal, and a storage battery terminal, and provided with a plurality of electromagnetically actuated control devices, including a voltage control, a current control and a storage battery cutout control, each having a switch and a co-operating electromagnet, each said switch being connected to a different one of said terminals, said apparatus comprising in combination a portable casing having three terminals, leads for temporarily connecting said terminals to the respective terminals of said battery charger, a source of static electric power, a first current-responsive non-metering signal means, in circuit with the switches of said voltage and current controls and said power source, a second current responsive non-metering signal means in circuit with the switch of said cutout control, meter means for determining the operating voltage of said voltage control and said cutout control, and the operating current of said current control, a first resistor, a second resistor, a manually operated switch connecting said first resistor in series with said meter means when in one position and connecting said second resistor in shunt with said meter means when in another position.

EDWARD SALZBERG.

REFERENCES CITED

The following references are of record in the file of this patent:

UNITED STATES PATENTS

| Number | Name | Date |
| --- | --- | --- |
| 1,397,247 | Fitzgerald | Nov. 15, 1921 |
| 2,096,131 | Oestermeyer | Oct. 19, 1937 |
| 2,352,499 | Sears | June 27, 1944 |

OTHER REFERENCES

Dyke's Automobile Encyclopedia, fifteenth edition, Goodheart-Willcox Co. Publishers, 1928, pages 403 and 404.